United States Patent [19]

Rotta, Jr.

[11] Patent Number: 4,589,806
[45] Date of Patent: May 20, 1986

[54] TAP AND DRILL GUIDE

[76] Inventor: James W. Rotta, Jr., 6627 Scarbrough Rd., Anderson, Calif. 96007

[21] Appl. No.: 710,854

[22] Filed: Mar. 12, 1985

Related U.S. Application Data

[63] Continuation of Ser. No. 503,903, Jun. 13, 1983, abandoned.

[51] Int. Cl.⁴ .............................................. B23B 49/02
[52] U.S. Cl. ................................. 408/72 R; 408/72 B; 408/115 R; 408/115 B
[58] Field of Search ............. 408/115 B, 72 B, 241 B, 408/115 R, 72 R, 103, 108, 109, 97, 241 R, 241 G; 33/189; 145/129

[56] References Cited

U.S. PATENT DOCUMENTS

| | | | |
|---|---|---|---|
| 2,342,033 | 2/1944 | Barabas | 408/97 X |
| 2,383,953 | 9/1945 | Beard | 408/115 B |
| 2,535,581 | 12/1950 | Klingman | 408/103 X |
| 3,204,493 | 9/1965 | Severdia | 408/115 B X |
| 3,674,376 | 7/1972 | Silken | 408/115 R |
| 3,804,546 | 4/1974 | Boyajian | 408/115 R |
| 4,294,567 | 10/1981 | Wiggins | 408/72 R |
| 4,474,514 | 10/1984 | Jensen | 408/115 B X |

Primary Examiner—Z. R. Bilinsky
Assistant Examiner—Glenn L. Webb
Attorney, Agent, or Firm—Leonard D. Schappert

[57] ABSTRACT

A tap and drill guide consisting of arms extending outward from a center and having guide means positioned at the outer end of each arm for guiding taps and drills.

1 Claim, 3 Drawing Figures

TAP AND DRILL GUIDE

This is a continuation of application Ser. No. 503,903 filed June 13, 1983, now abandoned.

BACKGROUND OF THE INVENTION

1. Field of the Invention

This invention relates generally to the area of machine tools, and more specifically to that area of machine tools concerned with supporting taps and drills during use so that holes are drilled straight and tapped straight.

2. Description of the Prior Art

In the past, inventors designed drill or tap guides which generally consisted of square or rectangular blocks with holes of given diameters drilled in them. When starting a drill or beginning to a tap a hole, the operator held the tap-guide block tightly against the piece of material being drilled or tapped to direct the bit or tap. Further inventive efforts were directed toward tap guides with coded and interchangeable drill bushings, designed so that a single tap or drill guide block could be used for drills of many different sizes.

Applicant is unaware of any invention which teaches the unique aspects of the present invention, specifically a construction such as that of the present invention in which the tap or drill guide is sufficiently flexible to enable an operator to use the tap or drill guide in small spaces.

SUMMARY OF THE INVENTION

The present invention consists of a tap and drill guide which has a body consisting of arms extending outward from a center, all at angles substantially equal to one another. Each arm has a lobe at its end, and each lobe has a hole drilled therein with the diameter of a common drill size or tap size. The outer dimension of the lobes is such that the wall area between the outer surfaces of the lobes and the inner surfaces created by the holes is minimal, thereby enabling an individual to use the tap guide in tight spaces such as cutout areas where a normal tap guide would not be usable.

One of the objects of the present invention is to provide a tap and drill guide which is inexpensive to construct.

Another object of the present invention is to provide a tap or drill guide which, because of its construction, uses a minimal amount of structural material and is therefore lightweight.

Another object of the present invention is to provide a tap or drill guide which, because of its unique structure, enables an individual to use it in small or tight spaces where a normal tap guide would not fit.

A further object of the present invention is to provide a tap or drill guide with the capability of guiding taps or drills of several different sizes and which is so constructed that it is usable in very small spaces.

The foregoing objects, as well as other objects and benefits, will become clearer in the following descriptions.

DESCRIPTION OF THE PREFERRED EMBODIMENT

Figure 1:
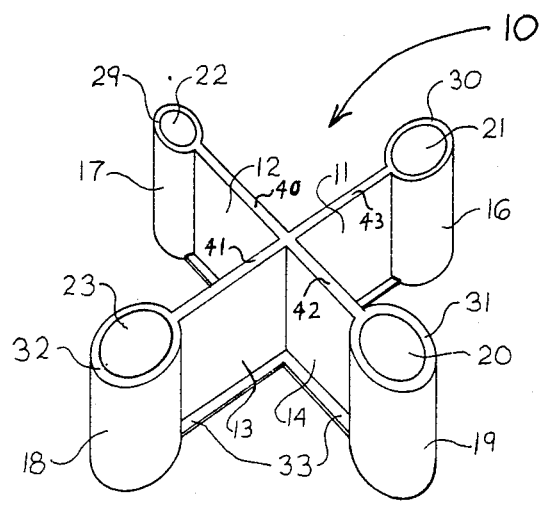
FIG. 1 is a perspective view of a tap or drill guide constructed in conformance with the present invention.

FIG. 1 of the drawings shows a perspective view of a four-lobed tap guide (10). The basic body of tap guide (10) consists of four arms (11), (12), (13) and (14), with arms (11) and (13) being set at substantially right angles to arms (12) and (14). Each of the arms (11), (12), (13) and (14) has a lobe at its outermost extremity. Lobe (17), which is the smallest of the four lobes, has hole (22) drilled therein, the diameter of which is a common drill and/or tap size. Lobes (16), (18) and (19) and the holes (20), (21) and (23) drilled therein become successively larger to accommodate larger taps and/or drills. The thickness of walls (29), (30), (31) and (32) is kept to a minimal dimension, this dimension being determined on the basis of the type and strength of the material being used to construct the tap guide (10). When plastic is used, as in the case of molding the complete tap guide (10) out of plastic, structural support (33) is provided along the bottom area of each of the arms (11), (12), (13) and (14) to strengthen them. If tap guide (10) is constructed of metal, support may not be required. Walls (40), (41), (42) and (43) of arms (11), (12), (13) and (14) are also made as thin as the structural material will permit.

Figure 2:
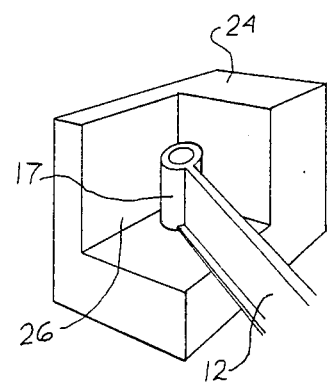
FIG. 2 is a perspective view showing one arm of the tap guide in place in a substantially square cutout area and showing its use in a position where most tap guides would not fit.

FIG. 2 shows a perspective view of arm (12) and lobe (17) of tap guide (10) in place against the inner corner of cutout (26) of block (24). Because of the thinness of wall (29) of lobe (17) as shown in FIG. 1, and because of the placement of lobe (17) at the extremity of arm (12), the hole in tap guide (10) fits close to the inner edge of cutout area (26). Because of this unique structure, that same lobe (17) with hole (22) could be utilized as a support for drilling or tapping a hole in substantially any area or on any plane of the cutout area (26).

Figure 3:
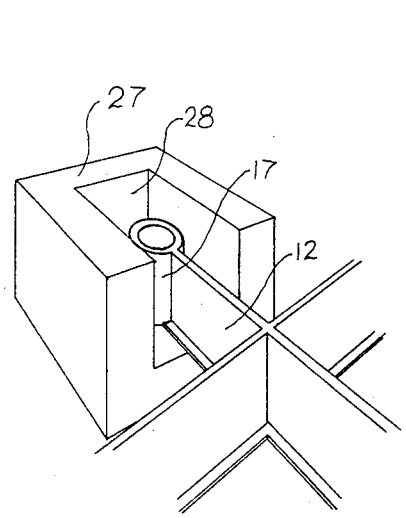
FIG. 3 is a perspective view showing the tap guide in use in a slotted space of a piece of metal and in a position where most tap guides would not fit.

FIG. 3 shows a block of metal (27) with a slot (28) cut therein. Because of the limitations of the width of slot (28), a normal tap guide could not be used unless specifically designed for narrowness; however, because of the thinness of walls (29), (30), (31) and (32) of lobes (16), (17), (18) and (19), and specifically in this instance the thinness of wall (29) of lobe (17), the operator can, by utilizing tap guide (10) as shown, drill a hole of relatively large diameter in comparison to the width of slot (28) in block (27).

Because of the unique construction of the present invention, it is usable in many situations and positions where a normal tap guide will not fit or function. While the present invention utilizes a basic body consisting of four arms with substantially cylindrical lobes attached at the ends, each of the lobes having holes of common drill or tap size drilled in them, it is not applicant's intent to limit protection of his invention to a four-armed, four-lobed drill or tap guide. The unique aspects of the present invention are also present in cases where a single arm with a lobe at one end is provided for tap guide purposes, and where a single arm with lobes at both ends is provided. Because further improvements and refinements in the design of the present invention will readily occur to those skilled in the art of making tap guides, it is applicant's intent that protection not be limited by any of the disclosure herein, but only by the claims which follow.

I claim:

1. A guide for use in drilling and tapping holes, comprising:

four guide means, each consisting of a substantially cylindrical lobe having:
- a height and an outer diameter which is substantially perpendicular to said height;
- a hole therein positioned substantially concentrically with respect to said outer diameter of said lobe, said hole being of a diameter useful in guiding a tap, and
- a wall defined by said outer diameter of said substantially cylindrical lobe and said diameter of said hole, said wall being of a sufficient thickness to ensure structural integrity of said guide means during use of said guide, and a body having a center and four arms attached to one another at said center of said body, said arms extending outward from an axis defined by said center of said body and positioned at substantially 90-degree intervals about said axis, each of said arms having a height and a thickness, said thickness being of a lesser dimension than said height and also of a lesser dimension than said outer diameter of the smallest of said guide means, each of said arms further having an outer end attached to one of said four guide means and oriented so that said height of said arm to which said guide means is attached is substantially perpendicular to said diameter of said hole in said guide means and so that said thickness of said arm to which said guide means is attached is substantially perpendicular to said height of said guide means.

* * * * *